No. 668,881. Patented Feb. 26, 1901.
J. O'MEARA.
VALVE.
(Application filed Apr. 2, 1900.)
(No Model.)
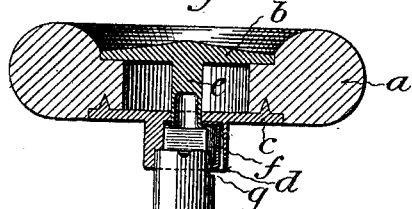
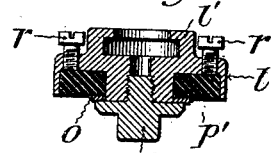
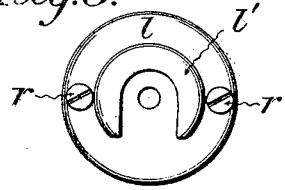
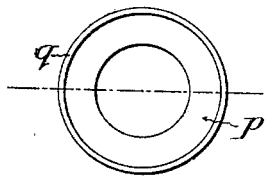
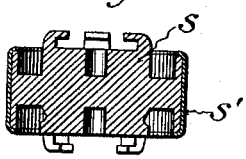
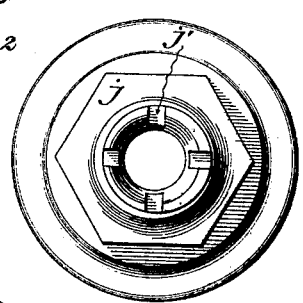
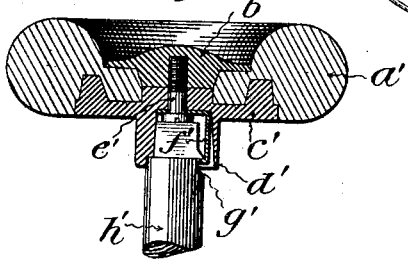
Witnesses: Inventor:
Jeremiah O'Meara
by Wm. H. Finckel
Atty.

UNITED STATES PATENT OFFICE.

JEREMIAH O'MEARA, OF NEW YORK, N. Y.

VALVE.

SPECIFICATION forming part of Letters Patent No. 668,881, dated February 26, 1901.

Application filed April 2, 1900. Serial No. 11,150. (No model.)

*To all whom it may concern:*

Be it known that I, JEREMIAH O'MEARA, a citizen of the United States, residing at New York, in the county of New York and State of New York, have invented a certain new and useful Improvement in Valves, of which the following is a full, clear, and exact description.

This invention relates to valves of the class represented generally by globe-valves; and the objects of the invention are to provide a concealed or secret fastening by which the hand-wheel or handle is attached to the valve-stem, also to secure the packing for the valve-stem, and also to provide for the economic production and packing of the disk-holder. In carrying out these several objects of my invention I conceal within the hub of the hand-wheel or handle a spring-catch which automatically engages a notch in the stem in such way as to securely apply the hand-wheel or handle to the stem without the fastening medium being externally apparent. This concealed spring-catch may be applied in a variety of ways, only two of which are illustrated.

In order to secure the packing in place between the upper outer end of the bonnet and the screw-cap which covers it, I provide notches in the bonnet into which the material of the packing is forced and whereby it is held from rotation.

The disk-holder instead of having the packing ring or disk pressed or vulcanized therein may have such ring or disk held therein by a washer and flanged screw, and the disk-holder may be provided with set-screws on its back by which the packing-disk may be forced out of the holder for renewal or other purposes. It sometimes occurs that the packing-disk is broken and the pieces fall away from the disk-holder and into the pipes to the detriment of the latter. In order to provide against this contingency, I supply the packing-disk with a circumferential band of metal, which will hold together the parts whenever the packing-disk is broken or cracked. By an extension of this last-named principle I may use disk-holders of iron or other inferior metal, and to provide against the escape of broken parts therefrom into the pipes I may apply a band of superior metal to the periphery, so as to hold together the parts.

In the accompanying drawings, illustrating my invention, in the several views of which like parts are similarly designated, Figure 1 is a longitudinal section of sufficient of a globe-valve to illustrate my improvements. Fig. 2 is a vertical section of one form of disk-holder, and Fig. 3 is a top plan view thereof. Fig. 4 is a plan view, and Fig. 5 a cross-section, of a banded packing-ring. Fig. 6 is a transverse section of modified form of banded disk-holder. Fig. 7 is a top plan view of the bonnet detached. Fig. 8 is a cross-section of a modified form of a concealed or secret hand-wheel fastening. Fig. 9 is a perspective view of a tool or implement that may be used for disconnecting the hand-wheel from the stem.

Illustrating one feature of this invention, I have shown the hand gripping portion as a wooden ring $a$, having a metal center plate $b$ and a metal bottom plate $c$, the latter having a hub $d$. The plate $b$ is provided with an integral tubular portion $e$, which is passed through an opening in the plate $c$ and within its hub $d$ and is headed up or upset on the lower side of said plate $c$, so as firmly to unite the metal parts of the hand-wheel and the ring $a$. I further utilize this tubular portion $e$ to support within the hub $d$ a spring-catch $f$, and this spring-catch is adapted to engage a notch $g$ in the end of the spindle $h$. Thus it will be seen that the spring-catch for engaging the spindle $h$, and thereby securing the hand-wheel or handle to said spindle, is concealed from view and the hand-wheel is not readily removable from the valve, and thus is avoided an evil perpetrated by malicious and thoughtless persons, especially in large buildings containing steam-heating plants. The hand-wheel and spindle are supplied with squared portions or other usual connections.

In my Patent No. 623,418, dated April 18, 1899, I have shown a concealed or secret screw for connecting the wooden and metal parts of a hand-wheel, and my present invention of a spring-catch is applicable to such a construction, as shown in Fig. 8, wherein $a'$ is the wooden ring, $b'$ the metal cap, $c'$ the metal base, having the dependent hub $d'$, and $e'$ is a screw for uniting these parts and also for supporting the spring-catch $f'$, which engages the notch $g'$ in the spindle $h'$.

A tool or implement $i$, Fig. 9, having the reduced and curved edge $i''$, may be provided for insertion into the notch of the stem between the stem and the spring-catch to disengage said spring-catch from the notched spindle or stem.

The bonnet $j$ may have its upper edge provided with a series of notches $j'$, having upright adjacent sides into which the packing is forced by the cap $k$, and thus such packing is held against rotation in either direction and the packing thereby preserved from undue wear and its integrity otherwise undisturbed.

The disk-holder $l$ may be provided with the undercut socket $l'$ to engage a flange $l^2$ on the end of the spindle, and the disk-holder and the spindle are centrally bored to receive a pin $m$ for uniting them against lateral displacement. This pin is held in place by a flanged screw $n$, and this flanged screw further supports a washer $o$, which in turn retains the packing ring or disk $p$ in the disk-holder. By interposing the washer $o$ between the packing and the screw I obtain a straight flat bearing for the washer and protect the packing against deformation and the grinding action of the screw.

The packing ring or disk $p$ may be of any preferred construction. As shown in Fig. 2, the packing ring or disk $p'$ may be of any suitable packing material vulcanized or otherwise inserted in the disk-holder. As shown in Figs. 1 and 4, it may be a ring of hard material, which is supplied with a circumferential metallic band $q$, flanged over its upper and lower edges and serving to preserve its integrity, should it be cracked or broken, and thus preventing the descent of broken pieces into the steam or other pipes.

It is necessary at times to replace the packing ring or disk, and in order to discharge it from the holder the set-screws $r$ may be inserted in the holder from the back, so as to be capable of being turned down against the packing, and thereby force it out of the holder.

The principle of banding a frangible object so as to preserve its integrity in case of its being cracked, as illustrated in the case of the packing ring or disk above described, may be extended to the disk-holder itself, especially when such disk-holder is made of inferior metal, as iron. In Fig. 6 I have illustrated such a disk-holder, it being a reversible disk-holder and comprising a metallic portion $s$, each end of which is provided with means for engagement with the spindle and with cavities for the reception of packing material. $s'$ is a circumferential band of superior metal, such as brass, applied to and flanged over the disk-holder. Of course this part of my invention is applicable as well to single disk-holders as to reversible disk-holders. The reversible disk-holder is adapted to be applied to the spindle—as, for example, is the reversible disk-holder of the Patent No. 623,418, hereinbefore referred to.

The valve-stem may be provided with a beveled shoulder $t$ to coöperate with a complemental recess in the bonnet $j$ in order to make a steam-tight joint at that point when the valve is opened.

The features of invention hereinabove mentioned and hereinafter claimed are susceptible of a variety of alterations within the scope and principle of my invention.

By the term "hand-wheel," herein used, I mean to include any of the usual forms of valve-operating devices.

What I claim is—

1. A hand-wheel, having a gripping portion, an outer plate, an inner plate provided with a hub, a concealed fastening for connecting these parts, and a spring-catch concealed within the hub and adapted to engage a stem or spindle, substantially as described.

2. A hand-wheel, having a gripping portion, an outer metal plate provided with a tubular portion, an inner metal plate provided with a hub, and a spring-catch concealed within the said hub, the said several parts being united by means of the upset end of the tubular portion, substantially as described.

3. In a valve, the bonnet provided at its upper end with notches having adjacent upright edges adapted to engage the packing and prevent its rotation in either direction, substantially as and for the purpose described.

4. A disk-holder for valves and a valve-stem, both bored axially, and a removable pin for uniting them, combined with a removable packing ring or disk, a washer $o$ upon which said packing ring or disk rests, and a flanged screw $n$ engaging the disk-holder, confining the pin, and supporting the washer, substantially as described.

5. A disk-holder, having a socket adapted to receive packing material, and provided on its back with ejecting-screws for forcing the packing out of said holder, substantially as described.

6. A packing for valves, having a circumferential metallic band flanged over its upper and lower edges, and adapted to hold together the packing, substantially as described.

7. A disk-holder for valves, having a circumferential band applied thereto, substantially as described.

8. A disk-holder, for valves, constructed of inferior metal, such as iron, and having circumferential binding of superior metal, such as brass, substantially as described.

In testimony whereof I have hereunto set my hand this 30th day of March, A. D. 1900.

JEREMIAH O'MEARA.

Witnesses:
 JOHN I. HOUSTON,
 THOS. E. MOE.